(12) United States Patent
Kawanami

(45) Date of Patent: Mar. 10, 2009
(10) Patent No.: US 7,502,556 B2

(54) PHOTOGRAPHING DEVICE WITH AUTO FOCUSING FUNCTION

(75) Inventor: Naoto Kawanami, Tokyo (JP)

(73) Assignee: Hoya Corporation, Tokyo (JP)

( * ) Notice: Subject to any disclaimer, the term of this patent is extended or adjusted under 35 U.S.C. 154(b) by 329 days.

(21) Appl. No.: 11/424,062

(22) Filed: Jun. 14, 2006

(65) Prior Publication Data
US 2006/0290932 A1     Dec. 28, 2006

(30) Foreign Application Priority Data
Jun. 23, 2005  (JP) ............................ P2005-183331

(51) Int. Cl.
G03B 3/10   (2006.01)
G03B 13/20  (2006.01)
G03B 13/30  (2006.01)

(52) U.S. Cl. .................. 396/121; 396/139; 396/147

(58) Field of Classification Search ................. 396/121, 396/123, 139, 147
See application file for complete search history.

(56) References Cited

U.S. PATENT DOCUMENTS 5,121,151 A * 6/1992 Kawabata et al. ........... 396/122
5,365,302 A * 11/1994 Kodama ...................... 396/51
6,463,214 B1  10/2002 Nakata
6,522,393 B2   2/2003 Higashino
6,771,899 B2 * 8/2004 Nonaka ...................... 396/121
6,859,619 B2   2/2005 Kurosawa
6,987,538 B1   1/2006 Nakata et al.
2003/0156216 A1 * 8/2003 Nonaka ...................... 348/345

FOREIGN PATENT DOCUMENTS

JP       2001-154083       6/2001

OTHER PUBLICATIONS

English Language Abstract of JP 2001-154083.

* cited by examiner

*Primary Examiner*—W. B. Perkey
*Assistant Examiner*—Minh Phan
(74) *Attorney, Agent, or Firm*—Greenblum & Bernstein, P.L.C.

(57) ABSTRACT

A focusing device includes a distance measurer, a focus adjuster, a focusing judge, and an area display. The focus adjuster measures area subject distances that are distances to a plurality of distance-measuring areas on a subject. The focus adjuster adjusts a focus to focus on the distance-measuring area. The focusing judge determines whether or not the distance-measuring area is a focus-adjustable area for which the focus adjuster can adjust a focus, based on the area subject distance. The area display displays the focus-adjustable area, such that one of the focus-adjustable areas for which the focus adjuster adjusts a focus can be selected as a selected area, based on the area subject distance.

11 Claims, 5 Drawing Sheets

FIG.4

| DISTANCE-MEASURING AREA | AREA SUBJECT DISTANCE | RESULT OF JUDGEMENT | COLOR |
|---|---|---|---|
| $AF_1$ | 12m | FOCUS ADJUSTABLE AREA | YELLOW |
| $AF_2$ | 11m | FOCUS ADJUSTABLE AREA | YELLOW |
| .. | .. | .. | .. |
| $AF_7$ | – | NON-ADJUSTABLE AREA | RED |
| $AF_8$ | 7m | FOCUS ADJUSTABLE AREA | YELLOW |
| $AF_9$ | 6m | CLOSEST ADJUSTABLE AREA | GREEN |

PHOTOGRAPHING DEVICE WITH AUTO FOCUSING FUNCTION

BACKGROUND OF THE INVENTION

1. Field of the Invention

The present invention relates to a photographing device having an auto focus function, and especially relates to a photographing device that can measure distances to a plurality of areas on a subject.

2. Description of the Related Art

Recently, photographing devices that have an auto focus function, and that can measure distances to a plurality of areas on a subject, are known. Further, automatically selecting a reliable distance value from among calculated distance values, and focusing based on the selected distance value, are known.

In photographing devices where a distance value is automatically selected from among the calculated distance values for focusing, the shortest-distance value is generally selected, therefore, the distance value for the subject on which a user wants to focus is not necessarily selected.

SUMMARY OF THE INVENTION

Therefore, an object of the present invention is to provide a photographing device that has an auto focus function, and that can easily focus on a desirable subject.

A focusing device according to the present invention includes a distance measurer, a focus adjuster, a focusing judge, and an area display. The distance measurer measures area subject distances that are distances to a plurality of distance-measuring areas on a subject. The focus adjuster adjusts the focus to focus on the distance-measuring area. The focusing judge determines whether or not the distance-measuring area is a focus-adjustable area for which the focus adjuster can adjust a focus, based on the area subject distance. The area display displays the focus-adjustable area, such that one of the focus-adjustable areas for which the focus adjuster adjusts a focus can be selected as a selected area, based on the area subject distance.

The area display may display a closest focus-adjustable area that is the focus-adjustable area having the shortest area subject distance of the focus-adjustable areas. The area display can display the focus-adjustable areas in order of shortest to longest area subject distance, based on a command from a user. Further, the area display can display the focus-adjustable areas in order of shortest to longest, or longest to shortest, area subject distance.

The focusing device can further include a data memory that stores subject distance data representing the area subject distance, and the data memory can store the subject distance data until the selected area is selected, or until new subject distance data are generated.

The area display can further display a non-adjustable area that is the distance-measuring area and that is determined not to be the focus-adjustable area. The area display can display the non-adjustable area to be differentiated from the focus-adjustable area.

The area display can display a closest focus-adjustable area that is the focus-adjustable area having the shortest area subject distance of the focus-adjustable areas, to be differentiated from the focus-adjustable areas other than the closest focus-adjustable area and the non-adjustable areas.

A photographing device according to the present invention includes a distance measurer, a focus adjuster, a focusing judge, an area display, and an image generator. The distance measurer measures area subject distances that are distances to a plurality of distance-measuring areas on a subject. The focus adjuster adjusts a focus, to focus on the distance-measuring area. The focusing judge determines whether or not the distance-measuring area is a focus-adjustable area for which the focus adjuster can adjust a focus, based on the area subject distance. The area display displays the focus-adjustable area such that one of the focus-adjustable areas for which the focus adjuster adjusts a focus can be selected as a selected area, based on the area subject distances. The image generator generates a subject image where the selected area is focused.

BRIEF DESCRIPTION OF THE DRAWINGS

The present invention will be better understood from the description of the preferred embodiment of the invention set forth below together with the accompanying drawings, in which:

FIG. 4 is a conceptual view representing area subject distance data for the distance-measuring areas of the still image of FIG. 3.

DESCRIPTION OF THE PREFERRED EMBODIMENT

Hereinafter, the preferred embodiment of the present invention is described with reference to the attached drawings.

Figure 1:
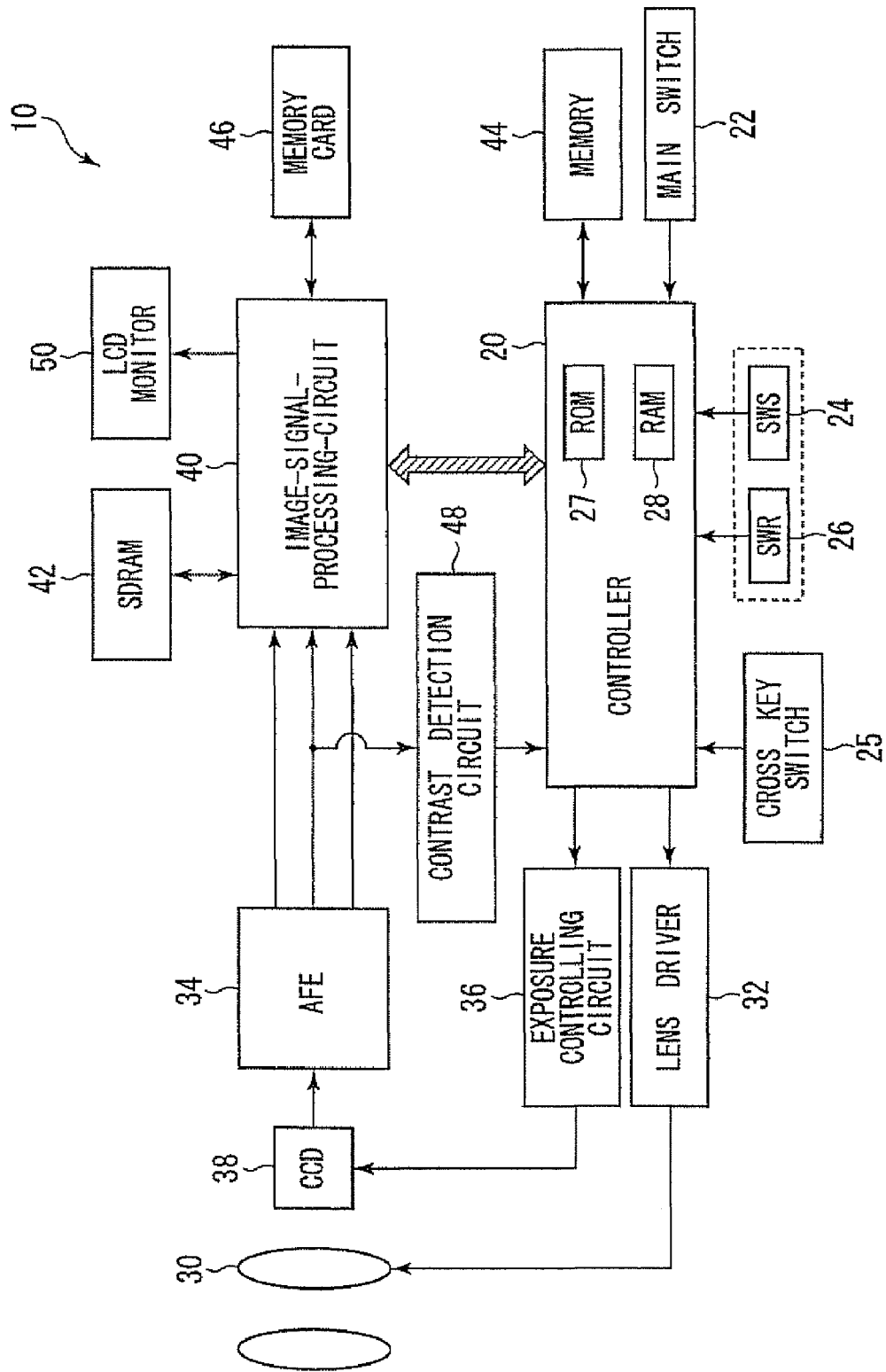
FIG. 1 is a block diagram of the digital camera of the embodiment.

As shown in FIG. 1, a digital camera 10 includes a controller 20 being a control circuit for controlling the whole entire digital camera 10, a memory 44, and so on. In the memory 44, data for signal processes at the controller 20 and so on have been previously stored. To the controller 20, a main switch 22, a photometry-measuring switch (SWS) 24, a release switch (SWR) 26 and so on are connected. The main switch 22 is turned on when a power switch (not shown) provided on the surface of the digital camera 10 is activated, and then the controller 20 starts. The photometry-measuring switch 24 is turned on when a release button (not shown) is half depressed, and the release switch 26 is turned on when the release button is fully depressed.

When the photometry-measuring switch 24 is turned on, the contrast of the subject is detected as explained below. First, a CCD 38, which has many pixels arranged rectangularly and whose exposure is controlled by an exposure controlling circuit 36, receives light transmitted through a photographing lens 30, and generates image signals for representing the subject. The image signals are transmitted to an image-signal-processing circuit 40 via an AFE 34, and various processes such as amplification, digitalization, white balance adjustment, and gamma correction are carried out.

Luminance data based on the image signals is transmitted to a contrast detection circuit 48. In the contrast detection circuit 48, the contrasts of nine distance-measuring areas of the subject explained below are respectively detected, that is, the contrasts are respectively detected in each area of the light receiving surface of the CCD 38, corresponding to the nine distance-measuring areas. Data representing the detected contrasts of the subject is transmitted to the controller 20, and is stored in a RAM 28 provided in the controller 20. Note that a ROM 27 in which data of the photographing lens 30 and so on are previously stored is also provided with the RAM 28 in the controller 20.

Driving signals for driving the photographing lens 30 by a motor (not shown) are transmitted to a lens driver 32 from the controller 20. The photographing lens 30 is driven slightly by the driving signals, the lens position is slightly moved, and image signals are again generated at the CCD 38. Luminance data is transmitted to the contrast detection circuit 48, based on the newly generated image signals, and contrasts are detected.

As explained above, the process of detecting contrasts on the same subject is repeated a plurality of times by moving the lens position of the photographing lens 30. In the RAM 28, data of detected contrasts in each distance-measuring area are stored. After the contrasts are detected, an area subject distance to each of a plurality of distance-measuring areas included in a photographing subject, is measured.

First, it is judged whether the peak of the contrast to the lens position of the photographing lens 30 represented by the contrast data previously stored in the RAM 28, exists or not by the controller 20. When it is judged that the peak of the contrast exists, an area subject distance is calculated based on the contrast peak. Further, it is determined whether focusing on a part of a subject included in each distance-measuring area is possible or not by the controller 20 based on the calculated area subject distance, a focal distance of the photographing lens 30, and an aperture value and so on.

Based on the result of the determination, it is determined whether each distance-measuring area is a focus-adjustable area where a focus can be adjusted to focus, or a non-adjustable area where a focus can not be adjusted to focus. Then, signals representing whether each distance-measuring area is a focus-adjustable area or a non-adjustable area are transmitted from the controller 20 to the image-signal-processing circuit 40. A distance-measuring area which is determined not to have the contrast peak is included in the non-adjustable areas, because the area subject distance is not calculated. Further, a closest focus-adjustable area, which is a focus-adjustable area having the shortest area subject distance of the focus-adjustable areas, is differentiated from other focus-adjustable areas and the non-adjustable areas. Signals representing which distance-measuring area is the closest focus-adjustable area, are also transmitted from the controller 20 to the image-signal-processing circuit 40.

Further, image signals that are processed by the image-signal-processing circuit 40 as explained above, and signals representing types of distance-measuring areas, are transmitted to an LCD monitor 50 via the image-signal-processing circuit 40, under the control of the controller 20. Therefore, a subject image, whose focus-adjustable area, closest focus-adjustable area, and non-adjustable area are respectively superimposed with predetermined colors, is displayed on the LCD monitor 50, as explained below. At that time, the lens driver 32 is controlled by the controller 20, so that the photographing lens 30 is moved to the predetermined focused position.

One of the displayed focus-adjustable areas can be selected as a selected area to be actually focused. This selection is carried out by an operation of a cross key (not shown) provided on a surface of the digital camera 10 by a user, by turning on a cross key switch 25. Because the closest focus-adjustable area having the shortest area subject distance of all the focus-adjustable areas is selected in many cases; the closest focus-adjustable area is displayed on the LCD monitor 50, to be differentiated from other distance-measuring areas, as explained above.

When one of the focus-adjustable areas, including the closest focus-adjustable area, is selected as the selected area, signals representing which focus-adjustable area is the selected area, are transmitted to the controller 20. Area subject distance data representing the area subject distance of the selected area are read by the controller 20 from the RAM 28 in which all of the area subject distance data had been previously stored. The lens driver 32 is controlled by the controller 20, which causes the lens driver 32 to move the photographing lens 30 to the focused position according to the area subject distance represented by the read area subject distance data. As a result, a subject included on the selected area is focused.

When the selected area is selected from focus-adjustable areas and the release switch 26 is turned on by fully depressing the release button, a shutter (not shown) is opened to a predetermined position for a predetermined time based on the control signals from the controller 20, so that image signals are generated in the CCD 38. Image signals are transmitted to the image-signal-processing circuit 40 via an AFE 34. Further, image signals transmitted from the image-signal-processing circuit 40, that is, image data of the photographed subjects, are transmitted to an SDRAM 42 and a memory card 46, and stored therein.

Note that a menu button (not shown) is provided on a surface of the digital camera 10, and a menu screen is displayed on the LCD monitor 50 by depressing the menu button. A plurality of modes for photographing a subject, replaying an image, and so on, can be set by selecting menu items on the menu screen by operations of the cross key and so on.

Figure 2:
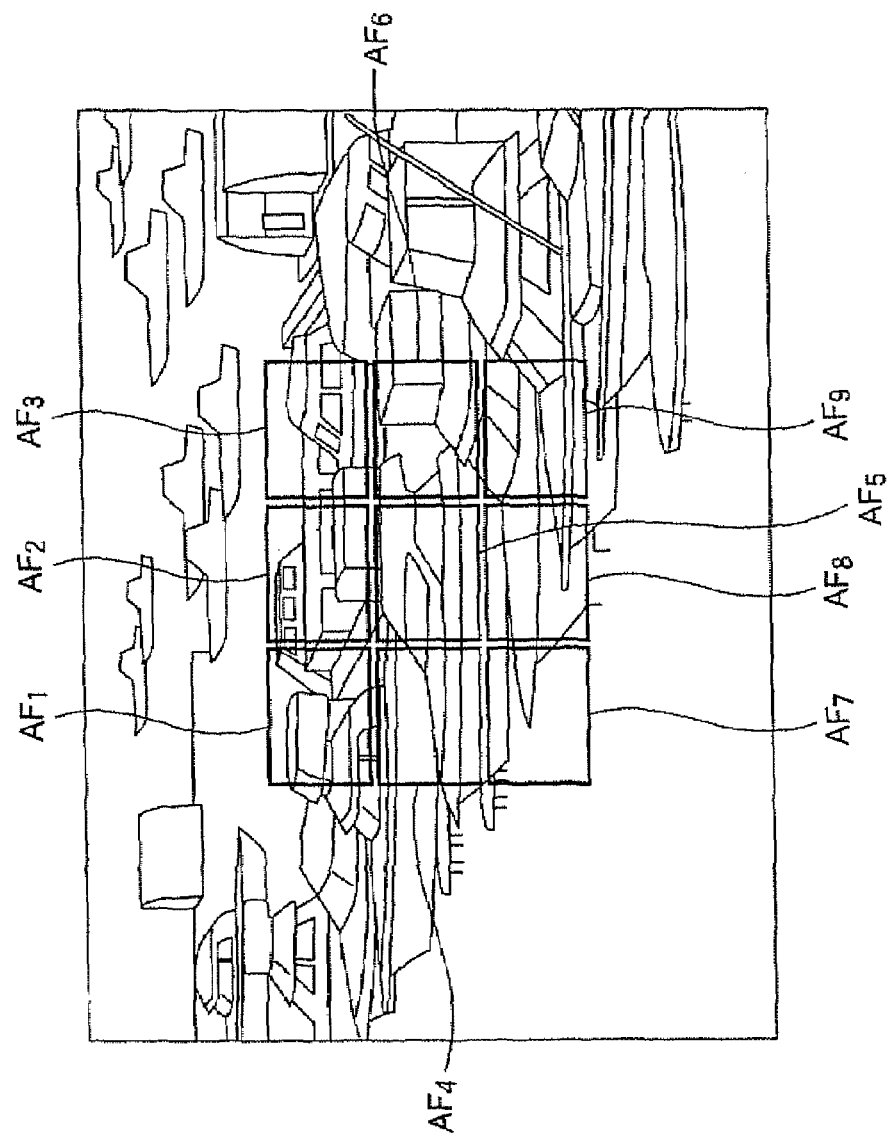
FIG. 2 is a view representing an example of a through image where distance-measuring areas are displayed on an LCD monitor.

When the main switch 22 is in the on state and the controller 20 is operating, a through image of a subject is displayed on the LCD monitor 50, as shown in FIG. 2. In the through image, outlines representing the first to ninth distance-measuring areas $AF_1$ to $AF_9$ are superimposed and displayed on a subject.

When the photometry-measuring switch 24 is turned on and area subject distances to the first to ninth distance-measuring areas $AF_1$ to $AF_9$ are measured, it is determined which of each of the first to ninth distance-measuring areas $AF_1$ to $AF_g$ is a focus-adjustable area, a closest focus-adjustable area, or a non-adjustable area. To show the result of the determination, one of three predetermined colors according to the focus-adjustable area, the closest focus-adjustable area, and the non-adjustable area, is superimposed to each of the first to ninth distance-measuring areas $AF_1$ to $AF_9$ in a still image (see FIG. 3). In this example, the first to sixth distance-measuring areas $AF_1$ to $AF_6$ and the eighth distance-measuring areas $AF_8$, which are the focus-adjustable areas, are colored yellow; the ninth distance-measuring area $AF_9$, which is the closest focus-adjustable area is colored green; and the seventh distance-measuring area $AF_7$, which is the non-adjustable area, is colored red; respectively.

As explained above, the first to ninth distance-measuring areas $AF_1$ to $AF_9$ are displayed differentiated into the focus-adjustable areas, the closest focus-adjustable area, and the non-adjustable areas, so that a user can easily select a selected area to be actually focused on, such as the ninth distance-measuring area $AF_9$ of the closest focus-adjustable area, from the focus-adjustable areas, and for example, exclude the seventh distance-measuring area $AF_7$ of the non-adjustable area.

Figure 3:
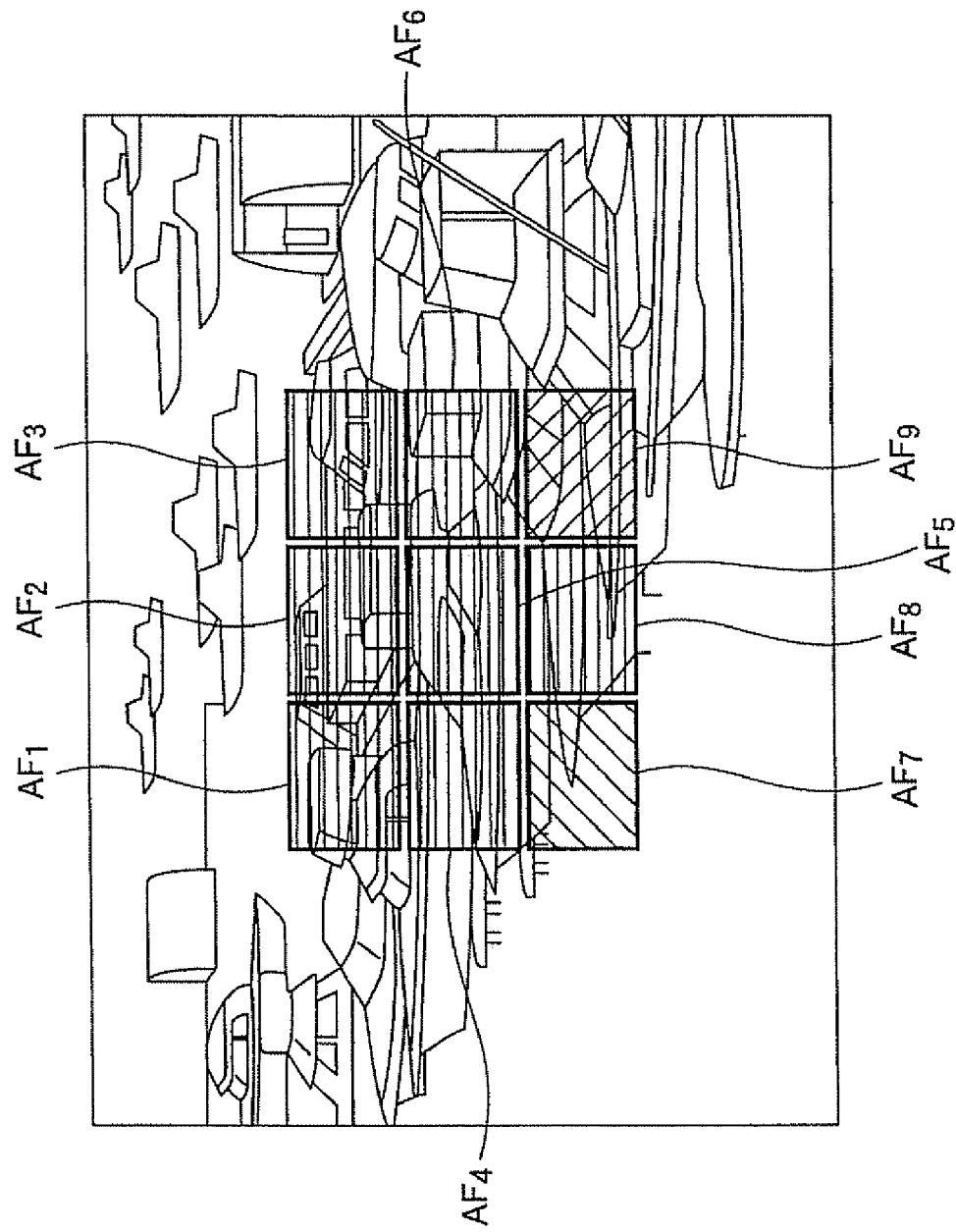
FIG. 3 is a view representing an example of a still image where focus-adjustable areas are displayed on an LCD monitor.

At that point, when the release switch 26 is turned on when the still image shown in FIG. 3 is displayed, the ninth distance-measuring area $AF_9$, which is the closest focus-adjustable area is automatically set as the selected area, so that the photographing lens 30 is moved to the focused position according to the area subject distance of the subject included in the ninth distance-measuring area $AF_9$.

On the other hand, as explained below, focus-adjustable areas, except for the ninth distance-measuring area $AF_9$, which is the closest focus-adjustable area, can be also selected by an operation of the cross key. First, an upper button of the cross key is depressed, and the cross key switch 25 corresponding to the upper button is turned on. At that time, the color on the ninth distance-measuring area $AF_9$, which is the closest focus-adjustable area, is changed from green to yellow, and at the same time, the color on the eighth distance-measuring area $AF_8$ with the second shortest area subject distance (see FIG. 4) is changed from yellow to green, because the eighth-distance-measuring area $AF_8$ becomes the most likely candidate for the selected area. When the upper button of the cross key is depressed again, the focus-adjustable area having the next shortest area subject distance to the formerly green colored focus-adjustable area is then colored green, and when the down button of the cross key is then depressed, the focus-adjustable area having the next longest area subject distance to the formerly green colored focus-adjustable area is then colored green.

When the release switch 26 is turned on after the operation of the cross key, a focus-adjustable area colored green at the time is set as the selected area, and an image where a subject in the selected area is focused on, is generated and displayed on the LCD monitor 50. As explained above, all focus-adjustable areas can be displayed in order of shortest to longest, or longest to shortest, area subject distance, then they can be selected and set as selected areas by operations of the cross key and the release switch 26.

Note that when all distance-measuring areas are non-adjustable areas, a user can immediately notice that no distance-measuring area can be focused, by looking at the LCD monitor 50 in this embodiment, therefore, the user can promptly take appropriate measures, such as changing the composition of the subject.

In the area subject distance data for each of the first to ninth distance-measuring areas $AF_1$ to $AF_9$, the calculated area subject distance, the result of the area judgment, and the color superimposed on the LCD monitor 50 are combined and stored in the RAM 28 as exemplified in FIG. 4. The area subject distance data are stored until when the release switch 26 is turned on and a selected area is selected, or when area subject distances to distance-measuring areas included in a new subject are measured. Then, the area subject distance data are deleted from the RAM 28 under the control of the controller 20, because the area subject distance data become unnecessary when a selected area is determined, or when new area subject distance data are generated.

Note that the colors represented in FIG. 4 are the ones first superimposed when the photometry-measuring switch 24 is turned on and a still image is displayed. Therefore, in the case when a closest focus-adjustable area is not selected as a selected area and another focus-adjustable area is selected instead of the closest focus-adjustable area, the colors for superimposition change. In this example, as explained above, a selected focus-adjustable area other than the closest focus-adjustable area $AF_9$ may be colored green, and the closest focus-adjustable area $AF_9$ may be colored yellow.

Figure 5:
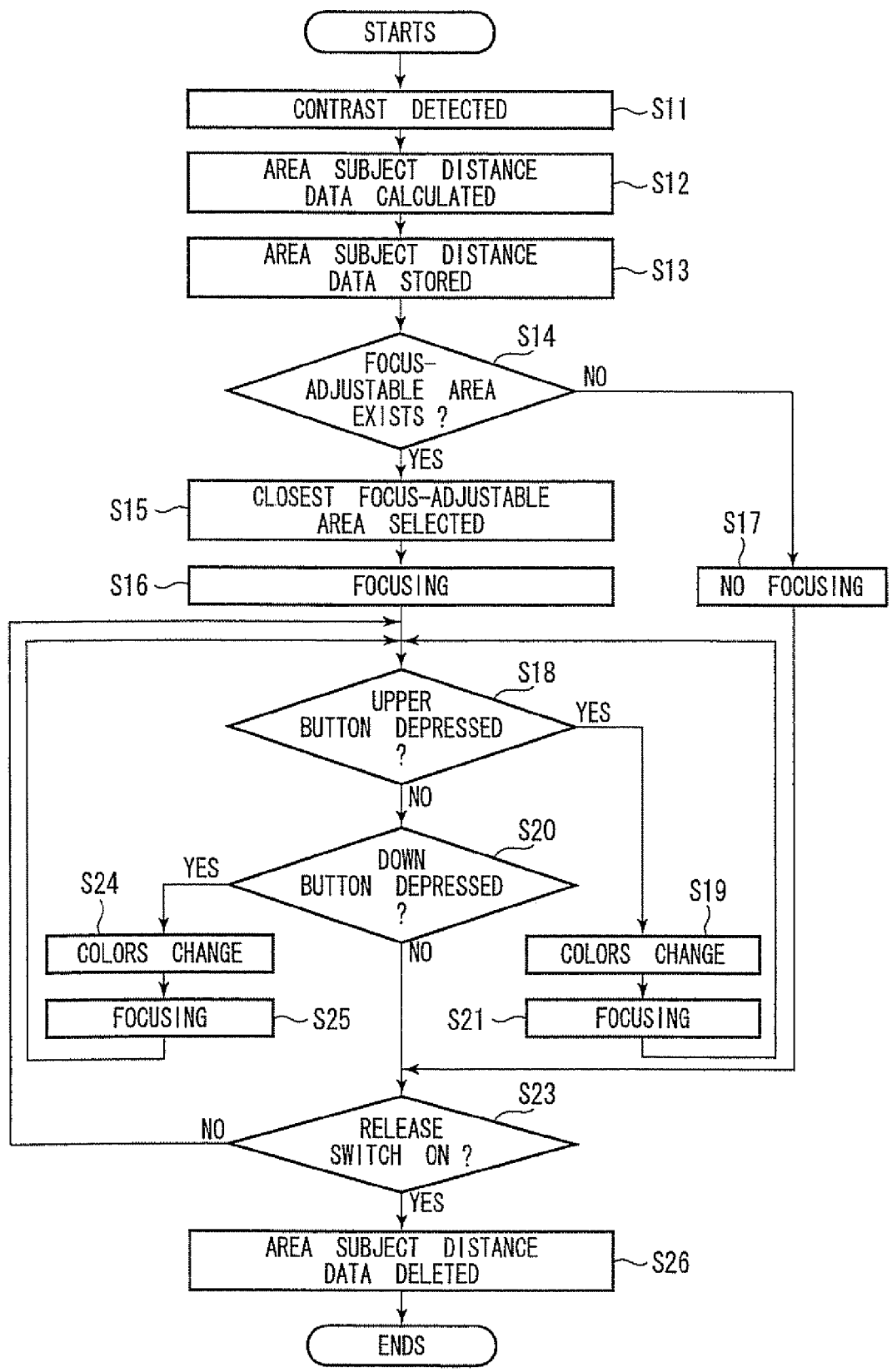
FIG. 5 is a flowchart representing a focus control routine.

The focus control routine represented in FIG. 5 starts when the photometry-measuring switch 24 is turned on. At step S11, contrasts of the first to ninth distance-measuring areas $AF_1$ to $AF_9$ are respectively detected, and the process proceeds to step S12. At step S12, the area subject distance data of the first to ninth distance-measuring areas $AF_1$ to $AF_8$ are calculated, and the process proceeds to step S13.

At step S13, the calculated area subject distance data are stored in the RAM 28, and the process proceeds to step S14. At step S14, it is determined whether a focus-adjustable area exists or not, and when it is determined that at least one focus-adjustable area exists, the process proceeds to step S15, and when it is determined that no focus-adjustable area exists, the process proceeds to step S17. At step S15, a closest focus-adjustable area is automatically selected, and the process proceeds to step S16.

At step S16, the photographing lens 30 is driven so that a subject in the closest focus-adjustable area is focused on, and the process proceeds to step S18. At step S18, it is determined whether the upper button of the cross key is depressed or not. When it is determined that the upper button is depressed, the process proceeds to step S19, and when it is determined that the upper button is not depressed, the process proceeds to step S20. At step S19, a focus-adjustable area having the next shortest area subject distance to the focus-adjustable area selected just before the upper button had been depressed, becomes a new candidate for a selected area, and colors on the still image change to indicate clearly the change in the types of the distance-measuring areas, and the process proceeds to step S21. At step S21, focusing on the newly selected focus-adjustable area is carried out, and the process returns to step S18.

At step S20, it is determined whether the down button of the cross key is depressed or not. When it is determined that the down button is depressed, the process proceeds to step S24, and when it is determined that the down button is not depressed, the process proceeds to step S23. At step S24, a focus-adjustable area having the next longest area subject distance to the focus-adjustable area selected just before the down button had been depressed becomes a new candidate for a selected area, and colors on the image change. Then, at step S25, focusing on the newly selected focus-adjustable area is carried out, and the process returns to step S18.

On the other hand, at step S17, because no focus-adjustable area exists, no focusing is carried out. That is, the photographing lens 30 is not moved, and remains in the position set at step S15. Then, the process proceeds to step S23.

At step S23, it is determined whether the release switch 26 is turned on or not. When it is determined that the release switch 26 is turned on, a subject image is photographed, and the process proceeds to step S26. On the other hand, when it is determined that the release switch 26 is turned off, the process returns to step S18. At step S26, the area subject distance data are deleted, and the focus control routine ends.

In the embodiment mentioned above, area subject distance data are calculated for each of the first to ninth distance-measuring areas $AF_1$ to $AF_9$, and the focus-adjustable areas in the distance-measuring areas are displayed on the LCD monitor 50 differentiated from the non-adjustable areas, so that focusing on a desired subject can be easily carried out by an AF function of the digital camera 10.

The AF mechanism is not limited to using the contrast detecting method in the embodiment, but such methods as a phase difference detecting method and so on can also be adopted.

Although nine distance-measuring areas $AF_1$ to $AF_9$ are provided at around the center of the photographing area of the digital camera 10, the number of the distance-measuring areas, their arrangement, and so on are not limited to those of the embodiment. For example, when the menu screen is displayed on the LCD monitor 50, the number and arrangement of the distance-measuring areas can be selected from the predetermined combinations. Further, although a desired selected area cannot be selected, a spot AF can be selected.

Methods for selecting and setting the selected area to be actually focused on are not limited to those of the embodiment. For example, regardless of the area subject distance data, a selected area could be selected based on the position in the displayed image on the LCD monitor 50, by operations of the cross key, and so on. Further, the LCD monitor 50 could be a touch panel for area selection without providing the cross key and so on. In this case, a user could select a selected area by touching a desired focus-adjustable area of a still image on the LCD monitor 50.

Methods for differentiating among a focus-adjustable area, a closest focus-adjustable area, and a non-adjustable area are not limited to coloring each entire area in a predetermined color of the embodiment. For example, coloring only an outline of each area could be effective in improving visibility of an image. Further, the nine distance-measuring areas $AF_1$ to $AF_9$ are displayed differentiating only between focus-adjustable areas and non-adjustable areas.

Finally, it will be understood by those skilled in the art that the foregoing description is a preferred embodiment of the apparatus, and that various changes and modifications may be made to the present invention without departing from the spirit and scope thereof.

The present disclosure relates to subject matter contained in Japanese Patent Application No. 2005-183331 (filed on Jun. 23, 2005) which is expressly incorporated herein, by reference, in its entirety.

The invention claimed is:

1. A focusing device, comprising:
   a distance measurer that measures area subject distances to a plurality of distance-measuring areas on a subject;
   a focus adjuster that adjusts a focus, to focus on each of said plurality of distance-measuring areas;
   a focus judger that determines whether each of said plurality of distance-measuring areas is a focus-adjustable area for which said focus adjuster is enabled to adjust a focus, based on said area subject distances;
   an area display that displays plurality of focus-adjustable areas for which said focus adjuster adjusts a focus for selection as a selected area, based on said area subject distances;
   a first operation member used for selecting an area from among the plurality of focus-adjustable areas in order of increasing area subject distances; and
   a second operation member used for selecting an area from among the plurality of focus-adjustable areas in order of decreasing area subject distances.

2. The focusing device according to claim 1, wherein said area display displays a closest focus-adjustable area, and wherein the closest focus-adjustable area has a shortest area subject distance of said plurality of focus-adjustable areas.

3. The focusing device according to claim 1, wherein said area display displays said plurality of focus-adjustable areas in order of increasing area subject distances.

4. The focusing device according to claim 1, wherein said area display displays said plurality of focus-adjustable areas in one of increasing area subject distances and decreasing area subject distances.

5. The focusing device according to claim 1, further comprising a data memory that stores subject distance data representing said area subject distances, wherein said data memory stores said subject distance data until one of said selected area is selected, and until new subject distance data is generated.

6. The focusing device according to claim 1, wherein said area display displays a non-adjustable area of said plurality of distance-measuring areas that is determined not to be said focus-adjustable area.

7. The focusing device according to claim 6, wherein said area display displays said non-adjustable areas differently from said focus-adjustable areas.

8. A focusing device according to claim 1, wherein at least one of said first member and said second member is operable by a user.

9. A photographing devices comprising:
   a distance measurer that measures area subject distances to a plurality of distance-measuring areas on a subject;
   a focus adjuster that adjusts a focus, to focus on each of said plurality of distance-measuring areas area;
   a focus judger that determines whether each of said plurality of distance-measuring areas is a focus-adjustable area for which said focus adjuster is enabled to adjust a focus, based on said area subject distances;
   an area display that displays a plurality of focus-adjustable areas for which said focus adjuster adjusts a focus for selection as a selected area, based on said area subject distances; and
   an image generator that generates a subject image where said selected area is focused;
   a first operation member used for selecting an area from among the plurality of focus-adjustable areas in order of increasing area subject distances; and
   a second operation member used for selecting an area from among the plurality of focus-adjustable areas in order of decreasing area subject distances.

10. A photographing device according to claim 9, wherein at least one of said first member and said second member is operable by a user.

11. A focusing device, comprising:
    a distance measurer that measures area subject distances to a plurality of distance-measuring areas on a subject;
    a focus adjuster that adjusts a focus, to focus on each of said plurality of distance-measuring areas;
    a focus judger that determines whether each of said plurality of distance-measuring areas is a focus-adjustable area for which said focus adjuster is enabled to adjust a focus, based on said area subject distances; and
    an area display that displays a plurality of focus-adjustable areas for which said focus adjuster adjusts a focus for selection as a selected area, based on said area subject distances,
    wherein said area display displays a non-adjustable area of said plurality of distance-measuring areas that is determined not to be a focus-adjustable area, and
    wherein said area display displays a closest focus-adjustable area having a shortest area subject distance of said plurality of focus-adjustable areas differently from said plurality of focus-adjustable areas other than said closest focus-adjustable area and differently from said non-adjustable areas.

* * * * *